April 5, 1960      I. D. SHAPIRO      2,931,918
AUTOMATIC CIRCUIT CONTROL FOR AUTOMOTIVE VEHICLE
Filed July 21, 1958
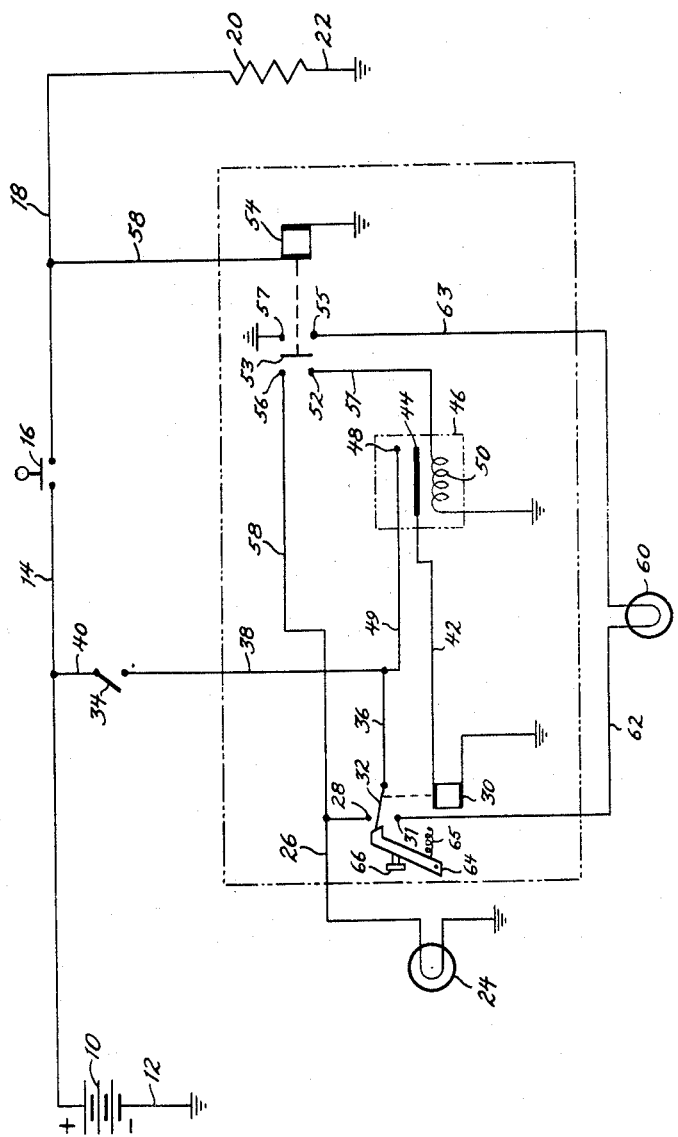
INVENTOR.
*IRVING D. SHAPIRO*
BY *Arthur H. Seidel*
ATTORNEY.

United States Patent Office 2,931,918
Patented Apr. 5, 1960

2,931,918

AUTOMATIC CIRCUIT CONTROL FOR AUTOMOTIVE VEHICLE

Irving D. Shapiro, New York, N.Y., assignor to Stravler, Inc., Staten Island, N.Y., a corporation of New York Application July 21, 1958, Serial No. 749,908

6 Claims. (Cl. 307—10)

This invention relates to an automatic circuit control or cut-off for automative vehicles and more particularly to a mechanism for breaking the electrical circuit of an automative vehicle after a predetermined period, when the generator of the vehicle is not in operation so as to prevent current drainage of the vehicle's battery.

In most automative vehicles there are some electrical equipment, such as the headlights, which have their own control switch independent from the ignition switch. It is not in infrequent occurrence that the driver of an automotive vehicle will park the vehicle for the night and forget to turn off the lights. This causes a current drainage of the vehicle's battery, which if not discovered in time could lead to discharging the battery to a level below that necessary to start the vehicle. It is not practical to shut off all the electrical equipment with the ignition switch since there are times when it is necessary to leave the headlights or parking lights burning for at least a short period of time after the motor has been shut off.

It is therefore an object of this invention to provide a circuit control or cut-off for an automotive vehicle which will automatically extinguish the headlights of the vehicle after a predetermined time from shutting off the vehicle's motor.

It is another object of the invention to provide an automatic circuit controller or cut-off for an automotive vehicle which will prevent inordinate current drainage and discharge of the vehicle's battery.

It is a further object of this invention to provide means for automatically turning off the headlights of an automotive vehicle after a predetermined time interval from the motor being turned off, which will remain in circuit breaking condition until manually reset.

It is still a further object of this invention to provide an automatic circuit controller or cut-off for the headlights of an automotive vehicle which operates in the event that the lights are inadvertently left on which includes means to signal the driver of the vehicle that the lights were automatically shut off.

Other objects will appear hereafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

The single figure is a schematic presentation of the circuit controller or cut-off of this invention.

Referring to the drawing, 10 designates the vehicle's battery, which may be of any conventional design, and which is grounded at one terminal by line 12. The other terminal of battery 10 is connected by line 14 to one side of ignition switch 16, which may be the conventional key operated switch normally provided in most automotive vehicles. Line 18 connects the other side of ignition switch 16 to the electrical equipment in the circuit designated by resistor 20. Such electrical equipment 20 may include the radio, window raisers, starter and other electrical equipment rendered operative when the ignition switch 16 is closed. Electrical equipment 20 is grounded by line 22.

The vehicle's headlights, diagrammatically designated at 24, can normally be operated independently of ignition switch 16. Headlights 24 are connected by line 26 to contact 28 of solenoid operated relay switch 30. Switching contact 32 of relay 30 is connected to light switch 34 through line 36 and line 38. Light switch 34 is connected to battery 10 through line 40 and line 14. During normal operation of the vehicle, relay 30 is not energized, so that the switching contact 32 engages contact 28 and thereby closes the circuit between headlights 24 and light switch 34.

The coil of relay 30 is grounded at one end and at the other end connected through line 42 to the switching contact 44 of a thermostat generally indicating at 46. Thermostat switching contact 44 is of the type which upon being heated for a predetermined interval of time will move against the other contact 48, such as a bimetallic arm or the like. Contact 48 of thermostat 46 is connected to line 38 through line 49. Thermostat heating coil 50 is grounded at one end and at the other end connected through line 51 to contact 52 of solenoid operated relay switch 54. The opposite contact 56 of relay 54 is connected through line 58 to contact 28 of relay 30. The coil of relay 54 is connected to ignition switch 16 through line 58 and line 18. A warning light, diagrammatically designated at 60, is connected at one side through line 62 to contact 31 of relay 30. The other side of warning light 60 is connected through line 63 to another contact 55 of relay 54. The opposite contact 57 of relay 54 is connected to ground. Included with relay 30 is a pivoted latch 64 which is urged by spring 65 toward switching contact 32 to lock the switching contact against contact 31. Latch 64 has a release knob 66 projecting therefrom to permit the releasing of switching contact 32.

In operation, when ignition switch 16 is closed, all of the vehicle's electrical equipment may be operated at will. Thus, the driver may utilize the vehicle's electrical equipment 20, or he may operate headlights 24 by closing light switch 34 which as previously described closes the circuit to the headlights. Closing ignition switch 16 also energizes the coil of relay 54 and thereby moves its switching contact 53 across contacts 55 and 57.

When the vehicle's ignition is turned off by opening ignition switch 16, but the driver neglects through an oversight to open light switch 34, the device of the present invention operates as follows:

The coil of relay 54 is de-energized causing its switching contact 53 to move across contacts 52 and 56. This permits a current to flow from battery 10 through light switch 34, line 38, line 36, switching contact 32 of relay 30, line 58, switching contact 53 of relay 54, and line 51 to thermostat heater coil 50. The flow of current through coil 50 causes the coil to heat up. After a predetermined time interval, as for example ten or so minutes, coil 50 has heated up enough to cause thermostat switching contact 44 to move against contact 48. This permits a current to flow to the coil of relay 30. Energizing of relay 30 pulls its switching contact 32 away from contact 28 and against contact 31 and thereby breaks the circuit to headlights 24 to turn them off.

Disengagement of switching contact 32 from contact 28 also breaks the circuit to thermostat coil 50 which permits coil 50 to cool down. After coil 50 has cooled sufficiently, thermostate contact switch 44 will move away from contact 48 and thereby break the circuit to relay 30. Although relay 30 is thereby de-energized, its switching contact 32 is prevented from moving back against contact 28 by latch 64 which had slipped over switching contact 32 when the contact was drawn down onto contact 31.

Engagement of switching contact 32 with contact 31 connects warning light 60 through light switch 34 to battery 10. When the driver of the vehicle returns and turns on the ignition, relay 54 will again be energized and switching contact 53 will be pulled across contacts 55 and 57. This completes the warning light circuit and warning light 60, which is located on the dash board of the vehicle, lights up to notify the driver that the light switch 34 is still closed and that the headlights 24 have been automatically turned off. When the driver opens light switch 34 warning light 60 will be turned off. However, in order to turn on the headlights 24 again the driver must pull release knob 66, which is also located on the dash board of the vehicle, to release switching contact 32 and permit it to return into engagement with contact 28.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. An automatic current cut-off circuit for the headlights of an automotive vehicle comprising the combination of a current source, an ignition switch for controlling the flow of current from said current source to certain of the electrical equipment of the vehicle, a circuit between said current source and said headlights independent of said ignition switch, said headlight circuit including a light switch and a solenoid switch which is normally closed, a circuit connecting the coil of said solenoid switch to said current source, said solenoid relay coil circuit including said light switch and a time delay switch, means for activating said time delay switch when the light switch is closed and the ignition switch is open, and means for retaining said solenoid switch open after it has been opened through energization of the solenoid coil.

2. An automatic current cut-off circuit for the headlights of an automotive vehicle comprising the combination of a current source, an ignition switch for controlling the flow of current from said current sources to certain of the electrical equipment of the vehicle, a circuit between said current source and said headlights independent of said ignition switch, said headlight circuit including a light switch and a solenoid switch which is normally closed, a circuit connecting the coil of said solenoid switch to said current source, said solenoid coil circuit including said light switch and a thermostatic switch, means for activating said thermostatic switch when the light switch is closed and the ignition switch is open, and means for retaining said solenoid switch open after it has been opened through energization of the solenoid coil.

3. An automatic current cut-off circuit for the headlights of an automotive vehicle comprising the combination of a current source, an ignition switch for controlling the flow of current from said current source to certain of the electrical equipment of the vehicle, a circuit between said current source and said headlights independent of said ignition switch, said headlight circuit including a light switch and a solenoid switch which is normally closed, a circuit connecting the coil of said solenoid switch to said current source, said solenoid coil circuit including said light switch and a thermostatic switch, said thermostatic switch including a heating coil and a switching contact which is urged to switch closing position upon heating of the heating coil, a circuit connecting said heating coil to the current source, said heating coil circuit including means for closing said circuit when said light switch is closed and the ignition switch is open, and means for retaining said solenoid switch open after it has been opened through energization of the solenoid coil.

4. An automotive current cut-off circuit for the headlights of an automotive vehicle comprising the combination of a current source, an ignition switch for controlling the flow of current from said current source to certain of the electrical equipment of the vehicle, a circuit between said current source and said headlights independent of said ignition switch, said highlight circuit including a light switch and a solenoid switch which is normally closed, a circuit connecting the coil to said solenoid switch to said current source, said solenoid coil circuit including said light switch and a thermostatic switch, said thermostatic switch including a heating coil and a switching contact which is urged to switch closing position upon heating of the heating coil, a circuit connecting said heating coil to the current source, said heating coil circuit including the solenoid switch, light switch, and means to complete the circuit upon opening of said ignition switch, and means for retaining said solenoid switch open after it has been opened through energization of the solenoid coil.

5. An automatic current cut-off circuit for the headlight of an automotive vehicle comprising the combination of a current source, an ignition switch for controlling the flow of current from said current source to certain of the electrical equipment of the vehicle, a circuit between said current source and said headlights independent of said ignition switch, said headlight circuit including a light switch, and a solenoid switch which is normally closed, a circuit connecting the coil of said solenoid switch to said current source, said solenoid coil circuit including said light switch and a thermostatic switch, said thermostatic switch including a heating coil and a switching contact which is urged to switch closing position upon heating of the heating coil, a circuit connecting said heating coil to the current source, said heating coil circuit including the solenoid switch, light switch and a second solenoid switch which is closed when the solenoid is not energized, the coil of said second solenoid switch being connected to said current source through said ignition switch, and means for retaining said first solenoid switch open after it has been opened through energization of the solenoid coil.

6. An automatic current cut-off circuit for the headlights of an automotive vehicle comprising the combination of a current source, an ignition switch for controlling the flow of current from said current source to certain of the electrical equipment of the vehicle, a circuit between said current source and said headlights independent of said ignition switch, said headlight circuit including a light switch and a relay which is normally in headlight circuit closing position, a circuit connecting the coil of said relay to said current source, said relay coil circuit including said light switch and a thermostatic switch, said thermostatic switch including a heating coil and a switch contact which is urged to switch closing position upon heating of the heating coil, a circuit connecting said heating coil to the current source, said heating coil circuit including said relay light switch and the deenergized position of a second relay, the coil of said second relay being connected to said current source through the ignition switch, a warning light, a circuit connecting said warning light to the current source, said warning light circuit including the light switch, the first relay in its headlight circuit open position and said second relay in its energized position, and means for releasably retaining said first relay in its headlight circuit open position.

References Cited in the file of this patent

UNITED STATES PATENTS 2,606,626    Meyer  ---------------- Aug. 12, 1952